United States Patent [19]

Willmott

[11] 3,716,865

[45] Feb. 13, 1973

[54] RADIO CONTROLLED SYSTEM FOR GARAGE DOOR OPENER

[75] Inventor: Colin B. Willmott, Chicago, Ill.

[73] Assignee: Chamberlain Manufacturing Corporation, Chicago, Ill.

[22] Filed: June 10, 1971

[21] Appl. No.: 151,862

[52] U.S. Cl. ....................343/225, 325/131, 325/164

[51] Int. Cl. ............................H04b 1/04, H04b 7/00

[58] Field of Search..........325/37, 43, 105, 111, 164, 325/131; 343/225; 340/207

[56] References Cited

UNITED STATES PATENTS

| | | | |
|---|---|---|---|
| 2,433,782 | 12/1947 | Murdoch, Jr. | 325/164 X |
| 3,319,167 | 5/1967 | Bray et al. | 325/105 X |
| 3,366,961 | 1/1968 | Goldstein | 325/37 X |
| 3,522,536 | 8/1970 | Reynolds | 325/37 |

*Primary Examiner*—Donald J. Yusko

*Attorney*—Hill, Sherman, Meroni, Gross & Simpson

[57] ABSTRACT

A closure operator including a simultaneously and synchronously pulsed and frequency modulated transmitter for use in conjunction with a remote receiver for controlling a closure operator and in which the range of control is substantially increased over prior art transmitters. By frequency modulating the pulse output of the transmitter, more energy will be received by the receiver without exceeding the radiation limits as established by the Federal Communications Commission thus allowing greater range. The circuit also utilizes a split stator type tuning capacitor in the transmitter which provides for a relatively constant frequency deviation component over a wide RF carrier tuning range.

5 Claims, 6 Drawing Figures

INVENTOR.
COLIN B. WILLMOTT

BY Kelly, Sherman, Meroni, Gross & Simpson ATTORNEYS

INVENTOR
COLIN B. WILLMOTT

BY Hill, Sherman, Meroni, Gross & Simpson ATTORNEYS

RADIO CONTROLLED SYSTEM FOR GARAGE DOOR OPENER

BACKGROUND OF THE INVENTION

1. Field of the Invention

This invention relates generally to closure operators as for example, garage door openers which utilize a radio transmitter and receiver and in which the transmitter is pulsed at the tone oscillator rate.

2. Description of the Prior Art

Modern radio controls for garage door openers operate in the 220 to 400 MHz frequency band and generally the receiver and transmitter are not normally crystal controlled because of the expense of such features. They are, therefore, subject to frequency drift which reduces the operating range over which control may be obtained. The receivers are normally designed to minimize the loss in range by utilizing super-regenerative detectors which have sensitivities of less than 10 micro-volts and 6 db bandwidths of 2–3 MHz.

Regulatory laws require that the average transmitted field strength be maintained below specified levels and practical radio remote systems which comply with this law do not provide acceptable operating distances when using circuits of the prior art.

SUMMARY OF THE INVENTION

The present invention utilizes a transmitter which transmits burst of radio frequency energy at the tone oscillator rate wherein the radio frequency signal is simultaneously frequency modulated. Thus, the invention is analogous to a machine gun firing at a target of finite width in successive sweeps always starting at a first point and ending at another point. As long as the target is within the sweep range, some bullets will hit the target. Too narrow a sweep will miss the target, and too wide a sweep will not place enough bullets in the target. The present invention, by frequency modulating the carrier signal, assures that sufficient energy will be received at the receiver and passed through its RF amplifier to result in control from appreciable ranges.

The frequency modulation utilized in this invention must be accomplished so that undesired detector frequency doubling does not occur in the receiver. This requires that the transmitter carrier oscillator must sweep linearly and synchronously with the tone frequency such that the carrier frequency sweep is continuous and does not return to the starting frequency until the next tone cycle. This assures that the receiver detects only one cycle of tone pulse regardless of whether the receiver and transmitter are tuned exactly to the same carrier frequency. The carrier frequency deviation is maintained relatively constant at 3.5 MHz over the tuning range of 290–400 MHz and for every tone frequency only one component is changed to keep the deviation and linearity constant.

A split stator type tuning capacitor is utilized to obtain a relatively constant frequency deviation component over a wide RF carrier tuning range.

An advantage of this invention is that if the receiver becomes detuned, it will receive sufficient energy from the transmitter of this invention because of the frequency sweep of the FM transmitter and satisfactory operation will result.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
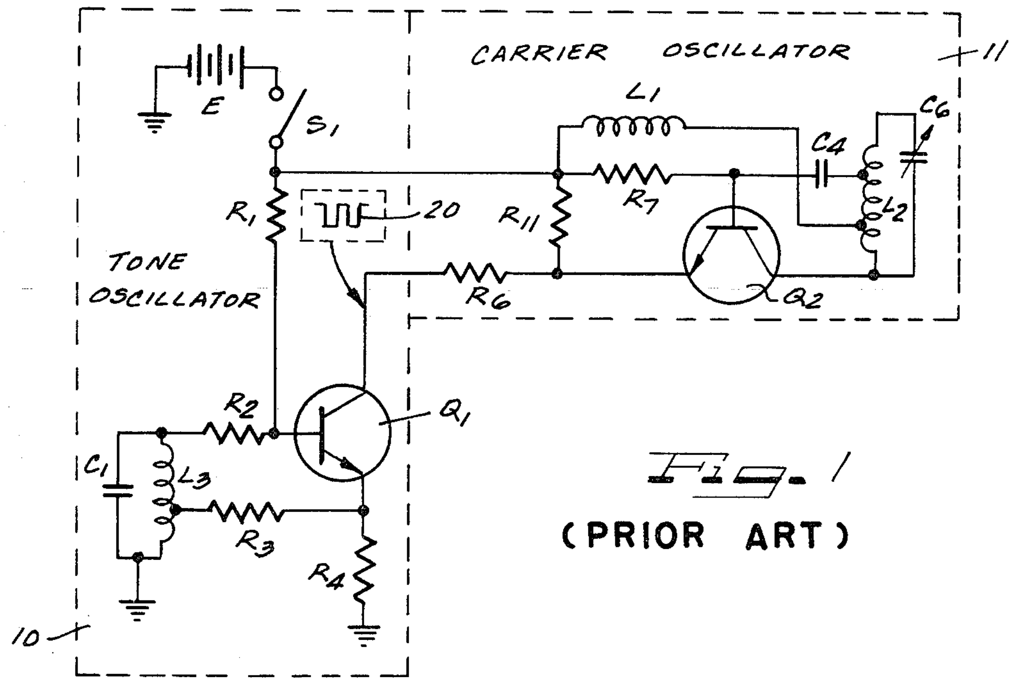
FIG. 1 (PRIOR ART)
FIG. 1 is a schematic of a transmitter of the prior art.
Figure 4A:
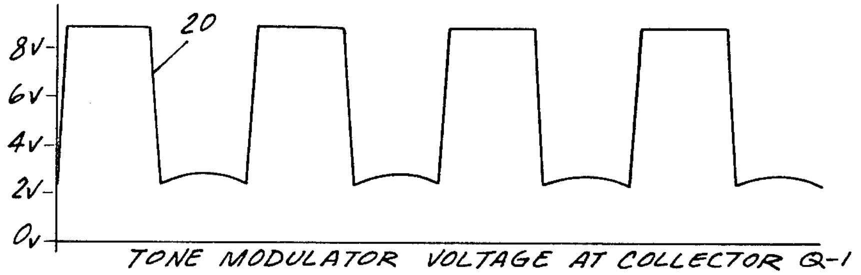
FIGS. 4A through C illustrate shapes appearing in various points in the transmitter circuitry.
Figure 4B:
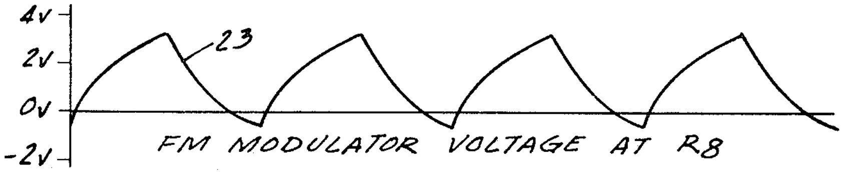

FIG. 1 illustrates the transmitter according to the prior art which utilizes a tone oscillator 10 which is connected to key a carrier oscillator 11 such that the radiated signal comprises a plurality of pulses at the tone oscillator frequency. The tone oscillator 10 includes a transistor Q1 which has its emitter connected to the resistors R3 and R4. The other side of resistor R4 is connected to the ground and the other side of resistor R3 is connected to a tap on inductor L3 which provides, with the capacitor C1, the tone frequency tuning circuit. One end of the tune circuit is connected to ground and the other end is connected to the resistor R2 which has its other side connected to the base of the transistor Q1. The base is connected through a resistor R1 to a switch S1 which has its other side connected to a battery E. The other side of the battery E is connected to ground. The carrier oscillator includes a transistor Q2 which has its emitter connected to the collector of transistor Q1 through the resistor R6. The base of transistor Q2 is connected through a resistor R7 to the switch S1. A resistor R11 is connected between the switch S1 and the emitter of transistor Q2. A capacitor C6 is connected in parallel with an inductor L2 and one end of the circuit is connected to the collector of transistor Q2. An inductor L1 is connected between the switch S1 and a tap point on the inductor L2. A capacitor C4 is connected between the base of transistor Q2 and a tap point on the inductor L2. When switch S1 is closed, the oscillator Q1 oscillates at the tone frequency which is determined by the tuned circuit comprising the capacitor C1 and the inductor L3. R1 and R2 provide turn-on bias and the resistors R3 and R4 are adjusted so as to obtain the best symmetry for the square wave at the output of the oscillator on the collector of transistor Q1 such that the negative portion of the square wave remains essentially flat as shown by the wave shape 20 at the collector of transistor Q1. The tap from the inductor L3 to the resistor R3 provides feedback to the emitter of transistor Q1 to feedback about 10 percent of the voltage across the tuned circuit. Since the transistor Q1 is either on or off depending on whether the switch S1 is open or closed, the transistor Q2 must turn off and on at the same tone frequency as illustrated in FIG. 4A by curve 20.

Resistor R7 provides turn-on bias for transistor Q2 and inductor L2 and C6 determine the carrier frequency. Capacitor C4 provides positive feedback to maintain oscillation of the oscillator and inductor L1 isolates the Rf from the battery E. The resistors R11 and R6 are adjusted to provide legal power output limit.

The present invention provides for the addition of an integrator and an FM modulator to the prior art transmitters so as to result in a lower average output as measured in a receiver with a bandwidth of 300 KHz, but results in no change in peak power output. The average detected signal in a receiver is a linear relationship between the frequency deviation of the transmitter and the bandwidth of the receiver as shown by:

$$Vav = \frac{V\text{ peak}}{2T} \int_0^t dt \qquad (1)$$

For a square wave modulated signal with no FM modulation, the following equation holds:

$$Vav = (V\text{Peak}/2\,T) \times T = V\text{Peak}/2 = -6\text{db} \qquad (2)$$

For a square wave modulated signal with a frequency modulation deviation of 10 times the receiver bandwidth, only 10 percent of the signal will be received by the receiver:

$$Vav = (V\text{Peak}/2\,T) \times (T/10) = V\text{Peak}/20 = -26\text{db} \qquad (3)$$

Thus, 26db is the maximum possible reduction of the average received signal with linear frequency modulation deviation. The utilization of FM modulation reduces the average field strength by 18 db over the peak field strength as compared to 6 db for typical modulation stems.

Figure 2:
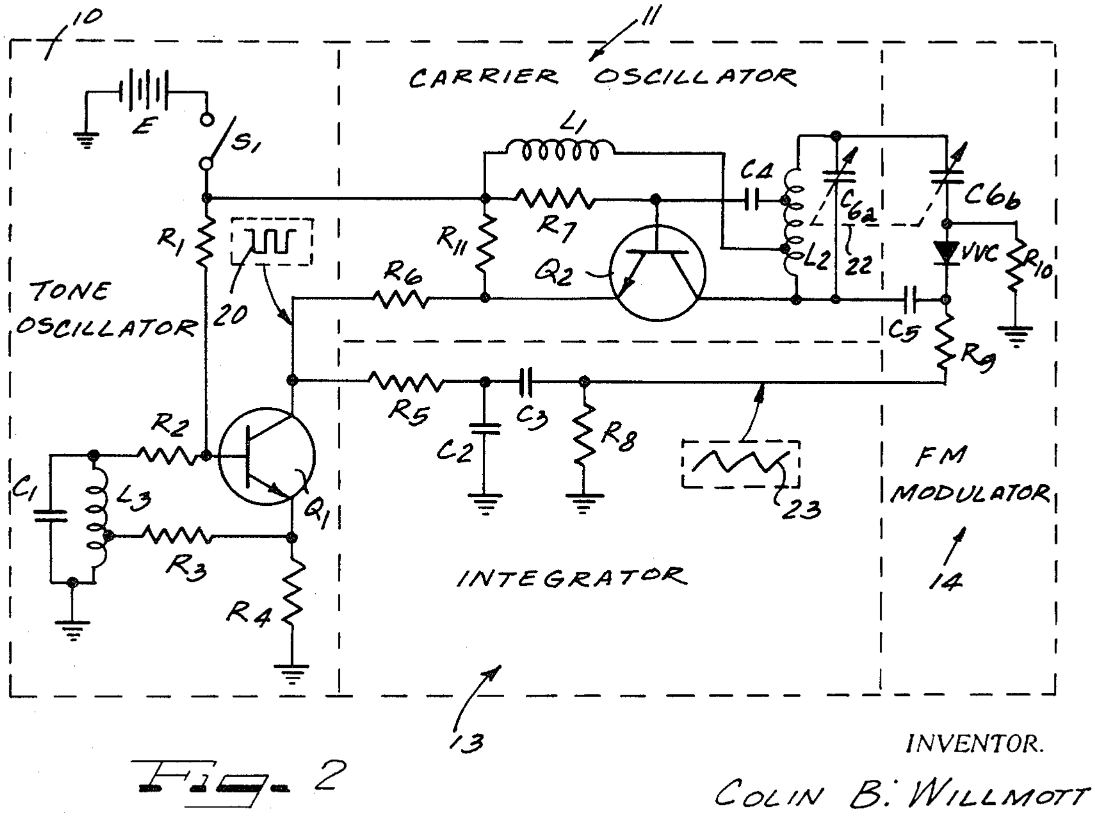
FIG. 2 is a schematic of the transmitter of the invention.

FIG. 2 illustrates the pulse frequency modulated transmitter of this invention wherein an integrator 13 and an FM modulator 14 have been added to the prior art circuit of FIG. 1 so that the transmitted signal is FM modulated. Since the tone oscillator and the carrier oscillator designated by numerals 10 and 11, respectively, may be the same as that of the prior art, the components of these elements in FIG. 2 will not be redescribed and are indicated by the same designations as in FIG. 1. An integrator 13 is connected to the collector of transistor Q1 with the resistor R5 having one side connected to the collector of transistor Q1 and the other side connected to capacitors C2 and C3. The other side of capacitor C2 is connected to ground, and the other side of capacitor C3 is connected to resistor R8 which has its opposite side connected to ground. The FM modulator 14 comprises a resistor R9 which is connected to the junction point between the capacitor C3 and the resistor R8 and which has its opposite side connected to a voltage variable capacitor designated as VVC. The other side of the voltage variable capacitor VVC is connected to a resistor R10 which has its opposite side connected to ground. A capacitor C5 is connected to the junction point between the voltage variable capacitor and the resistor R9 and has its other side connected to the collector of the carrier oscillator transistor Q2. The capacitor C6 of the carrier oscillator 11 is replaced by one-half of a split stator type tuning capacitor with one-half designated as C6*a* and connected in parallel with the inductor L2. The other half of the split stator capacitor is designated as C6*b* and has one side connected to a junction point between the inductor L2 and the capacitor C6*a* and the other side connected to a junction point between the resistor R10 and the voltage variable capacitor VVC. The split stator type capacitor has a rotor 22 so as to simultaneously vary the capacitance of the capacitor C6*a* and C6*b*.

The capacitance of the voltage variable capacitor VVC varies approximately inversely with the square root of the bias voltage applied to it. Thus, by integrating the square wave which appears at the collector of the transistor Q1 and indicated in the drawing, results in an exponential voltage that when applied to the voltage variable capacitor provides nearly linear frequency deviation in the tuned circuit of the carrier oscillator. It is to be noted that the voltage variable capacitor VVC, the capacitor C5, as well as the capacitors C6*a* and C6*b* with the inductor L2 form part of the tuned circuit which determines the frequency of the carrier oscillator 11 and as the capacitance of the voltage variable capacitor VVC varies, the frequency of the carrier oscillator 11 will be frequency modulated.

Thus, as the exponential voltage is applied to the voltage variable capacitor through the resistor R9, the carrier frequency will vary from $F_1$ to $F_2$ where $F_1$ is greater than $F_2$. The capacitor C2 and resistor R5 comprise the integrator, and the value of capacitor C2 depends upon the tone frequency. The exponential voltage across the resistor R8 is illustrated in curve 4*b* and is designated by numeral 23. This voltage is coupled through capacitor C3 and results in the low reference voltage of −1 volt due to the fact that the voltage variable capacitor goes into forward conduction. This prevents fluctuations in the voltage from the battery E from changing the carrier oscillator frequency.

Resistors R9 and R10 isolate the RF from the tone circuit and prevent tank circuit loading and together with R8 provide a D.C. reference for the voltage variable capacitor. The capacitor C5 is adjusted for a 1 percent deviation over the tuning frequency range, and the capacitor C6*b* provides most of the linear deviation correction.

Without the dual variable capacitor comprising capacitors C6*a* and C6*b*, the frequency deviation at the highest frequency would be much greater than at the lowest frequency.

Since % change in $F = \sqrt{1/\%\text{ change in } C_t}$ with *La* constant $$C_T = 2\frac{(C_T@F_1 - C_T@F_2)}{C_T@F_1 + C_T@F_2} \times 100$$

where $$C_T@F_1 = \frac{C6a + C6b \times C5 \times VVC@F_1}{(C6b \times C5) + (C6b \times VVC@F_1) + (C5 \times VVC@F_1)}$$

The differential in the capacitance of the voltage variable capacitor with applied voltage is constant regardless of the carrier frequency. The resultant percentage change of tank circuit capacitance ($C_T$) must be equal for all carrier frequencies. The value of C5 compensates for the constant change of capacitance in the voltage variable capacitor VVC when receiving the applied exponential voltage.

Figure 4C:
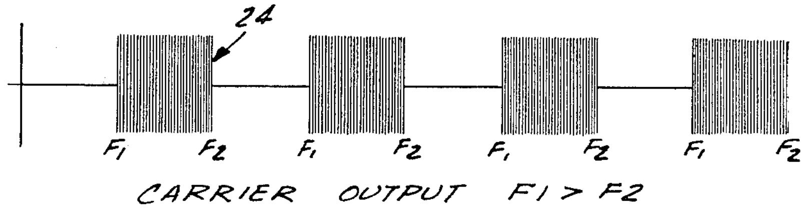

FIG. 4C illustrates the output of the carrier oscillator of FIG. 2, and it is to be noted that the oscillator produces an output at a pulse repetition frequency determined by the frequency of the tone oscillator 10 and that the carrier frequency is modulated between the range of $F_1$ to $F_2$ by the FM modulator 14 during the period of the transmitted pulse. This is designated in FIG. 4C by pulses 24.

Thus, this invention uses a split stator type tuning capacitor which provides for relatively constant frequency deviation component over a wide RF carrier tuning range such as in the range of 350 MHz ± 60 MHz.

Synchronous AM-FM modulation results in synchronous detection at the receiver such that the transmitted tone and the detected tone always contain the same fundamental frequency component regardless of slight carrier tuning differences between the transmitter and the receiver.

The utilization of the FM modulation reduces the average field strength by 18 db over the peak field strength compared to 6 db for typical modulation techniques.

Figure 3:
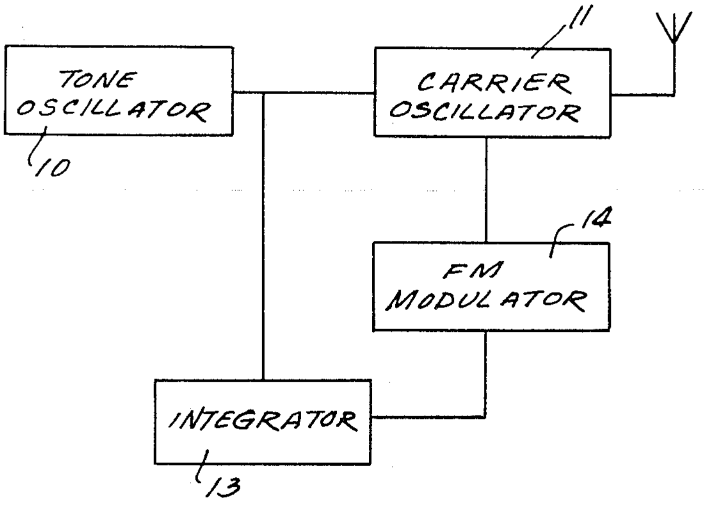
FIG. 3 is a block diagram of the transmitter of the invention.

Although in this invention the conventional garage door radio transmitter which utilizes a field adjustable tone frequency has been modified so as to obtain constant FM deviation and linearity by modifying the tone wave form, it is to be realized that a separate FM oscillator could be utilized for the FM component which oscillates at a frequency greater than 10 times higher than the highest tone frequency. The utilization of such separate oscillator will give the advantage of the simultaneous AM-FM modulation, however, a separate oscillator would increase the cost over that of the circuit of FIG. 3. FIG. 3 illustrates the invention in block form.

I claim as my invention:

1. A transmitter for remote control comprising:

a carrier frequency oscillator which includes a frequency controlling circuit;

a tone oscillator connected to said carrier frequency oscillator to key it on and off at the tone frequency;

an FM modulator;

a voltage variable capacitor forming a part of said FM modulator and said voltage variable capacitor connected to said frequency controlling circuit of said carrier frequency oscillator; and an integrating circuit receiving an input from said tone oscillator and supplying an output to said voltage variable capacitor.

2. A transmitter according to claim 1 wherein said integrating circuit comprises a resistor in series between said voltage variable capacitor and said tone oscillator and a capacitor connected in parallel with said tone oscillator.

3. A transmitter for remote control comprising:

a carrier frequency oscillator which includes a frequency controlling circuit;

a tone oscillator connected to said carrier frequency oscillator to key it on and off at the tone frequency;

an FM modulator;

a voltage variable capacitor forming a part of said FM modulator and connected to an output of said tone oscillator; and said frequency controlling circuit including a split stator capacitor having two capacitor portions and said voltage variable capacitor connected between said two capacitor portions.

4. A transmitter according to claim 3 wherein said split stator variable capacitor includes means for simultaneously varying the capacitance of said two capacitor positions.

5. A transmitter for remote control comprising:

a carrier frequency oscillator;

a tone oscillator connected directly to said carrier frequency oscillator to key it on and off at the tone frequency; and an FM modulator receiving an output of said tone oscillator and connected to said carrier frequency oscillator to sweep its output frequency from a frequency $F_1$ to a frequency $F_2$ each time the tone oscillator keys said carrier frequency oscillator on.

* * * * *